March 4, 1958  S. S. KOLODIN  2,825,114
BAND TIGHTENING MEANS
Filed May 9, 1955
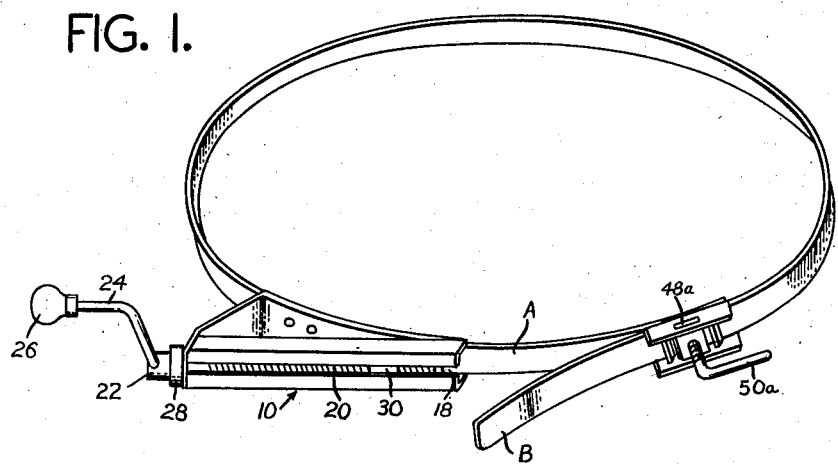
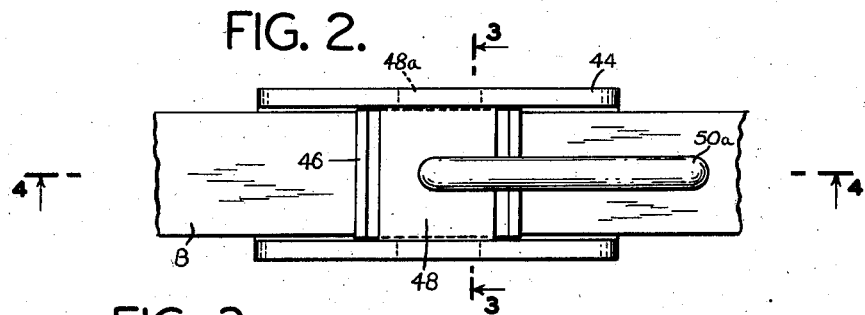
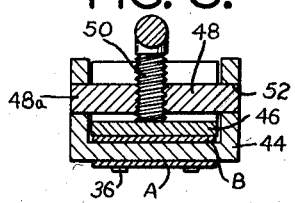
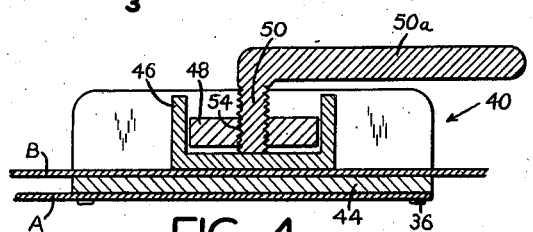
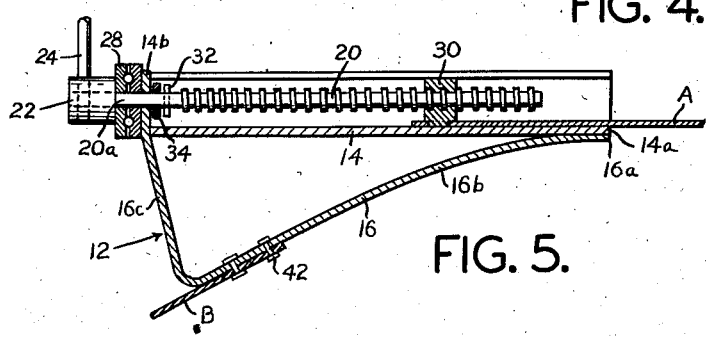
INVENTOR
SAMUEL S. KOLODIN.
BY
ATTORNEY

United States Patent Office 2,825,114
Patented Mar. 4, 1958

2,825,114

BAND TIGHTENING MEANS

Samuel S. Kolodin, Brooklyn, N. Y.

Application May 9, 1955, Serial No. 506,773

1 Claim. (Cl. 24—280)

This invention relates to band tightening means for compressing bales of newspapers, hay, cotton and the like and also tubeless tires and the like.

This band tightening means is intended for use where a temporary compressive force is required and it is not intended to remain permanently upon the compressed article. For example, it may be used to compress a pile of newspapers preparatory to forming a bale. Once the newspapers are compressed sufficiently, permanent fastening means may be applied thereto, such as metal bands or heavy twine or cord or the like. The band tightening means herein claimed would be removed from the bale as soon as the permanent fastening means is applied thereto. This device is useful in connection with tubeless tires which require compression from an outside source when mounted upon a wheel and before there is sufficient air pressure therein to provide an air-tight seal between the beads of the tire and the rim of the wheel.

An important object of this invention is the provision of band tightening means of the character described wherein an automatic safety release is provided in the nature of a safety means for operation when the pressure or tension exerted by said band tightening means attains a predetermined degree. This is an important feature since without it excessive tension may snap the band and cause it to fly through the air with sufficient force to cause serious injury.

In the present device, the automatic release may be manually set to various degrees of tension, for example, to resist from eight to ten pounds of pressure. When this device is mounted upon a tubeless tire, air is introduced into the tire to inflate it in the usual way. When the pressure in the tire builds up to between eight and ten pounds of pressure, the release will automatically function to loosen the band upon the tire. There are two advantages in this automatic feature, the first being that the band is released before excessive pressure builds up and the second being that release of the tension automatically readies the band for removal from the tire. Since the present device, including its band, is capable of withstanding tension many times in excess of ten pounds, the automatic release of the device upon the build-up of ten pounds of pressure is a safety factor which nullifies any possibility that the device and its band may snap open under excessive pressure in normal use.

This release mechanism is manually adjustable to any degree of tension or pressure so that a person operating the device may tighten it to the extent of resisting ten pounds of pressure while another person may choose to tighten it to resist only seven or eight pounds of pressure. However, in no case is it possible for a person operating this device to tighten it beyond the limits imposed by the manufacturer. If the manufacturer chooses a limit of ten pounds, no amount of tightening of the device will cause it to resist much more than ten pounds of pressure.

Another object of this invention is the provision of a band tightening device of the character described which may be completely opened up in the sense of breaking its continuity so as to facilitate mounting upon relatively inaccessible or partly inaccessible objects. This device, when mounted on an object and in operation, comprises a continuous member which assumes the outline shape of the object. For example, when mounted on a tubeless tire, it assumes a circular shape and when mounted on a bale of newspapers it would assume a generally rectangular shape. It may be loosened to enlarge its range of operations, without breaking its continuity. But it may also be disconnected at its release mechanism to break such continuity. This is particularly important where it is not possible to mount the band tightening device upon an object as long as said device retains its continuity.

Still another object of this invention is the provision of a screw-type tightening mechanism by which the band may quickly and easily be tightened upon an object to the extent permitted by the automatic release mechanism. This device operates by means of a screw and nut mechanism and a crank handle which is connected to the screw. Said crank may be manually operated in the same manner as the crank of a screw-type automobile jack.

The invention is illustrated in the accompanying drawing in which:

Fig. 1 is a perspective view of a band tightening device made in accordance with the present invention.

Fig. 2 is a plan view of the automatic release device.

Fig. 3 is a transverse section therethrough on the line 3—3 of Fig. 2.

Fig. 4 is a longitudinal section on the line 4—4 of Fig. 2.

Fig. 5 is a longitudinal section through the band tightening mechanism.

The band tightening device 10 shown in Fig. 1 includes a frame 12 which consists of a channel 14 and a strap 16. The channel is generally rectangular in cross-sectional view, having four walls, of which the top wall is provided with a longitudinally extending slot 18 as shown in Fig. 1. Strap 16 functions as a bracket and it is welded or otherwise secured at one end 16a to the corresponding end 14a of the channel. Said strap 16 is provided with a curved portion 16b behind its end 16a to correspond, for example, to the curvature of a tubeless tire. The strap is also provided with an upwardly or laterally extending portion 16c which is connected at one end to the curved portion 16b and its opposite end to the end 14b of the channel.

A screw 20 is disposed within channel 14, longitudinally thereof. One end 20a of said screw is free of screw threads and it projects through an opening in portion 16c of bracket 16. Secured to said outwardly projecting end 20a of the screw is a collar 22 and through said collar and also through portion 20a of the screw extends a rod 24. This rod is bent intermediate its ends and provided with a knob 26 at its free end and it will be seen that said rod comprises the handle by which the device herein claimed may be actuated. It will also be understood that said rod 24 serves to lock the screw 20a to the collar 22.

Between collar 22 and the end portion 16c of bracket 16 is a thrust bearing 28. It will be understood that this bearing takes up the longitudinal thrust of screw 20 when the device herein claimed is in operation and transmits said thrust to the frame 12.

A nut 30 is mounted on screw 20 in engagement therewith. It will be observed that said nut is confined within the channel 14 in such manner that it is free to move longitudinally only and not angularly or laterally. Consequently, when crank handle 24 is worked in one direction, nut 30 is pulled inwardly or leftwardly as viewed in Fig. 5. When the crank handle is turned in the opposite direction, nut 30 is freed for movement in the opposite direction, that is, outwardly or rightwardly as viewed in Fig. 5.

If desired, means may be provided to prevent screw 20 from pulling leftwardly out of channel 14, as viewed in Fig. 5. This means may comprise a pin 32 which extends through end 20a of screw 20 and a washer 34 between said pin and end portion 16c of bracket 16. This is conventional means for preventing endwise movement of the screw in one direction, collar 22 and thrust bearing 28 preventing endwise movement in the opposite direction. Furthermore, the use of pin 32 and washer 34 insures longitudinal movement of nut 30 in channel 14 when the crank handle 24 is operated in one direction while collar 22 and thrust bearing 28 insure movement of said nut in the opposite direction when the crank handle is operated in the opposite direction.

Secured to nut 30 by riveting or the like is one end of a band A which is secured by rivets 36 or any other suitable fastening means at its opposite end to the automatic release device 40 herein claimed. Band A is a relatively short strip of strong, flexible metal and it serves to attach said release device to the nut of the screw device. A second band B is connected at one end by means of rivets 42 to the curved portion 16b of bracket 16 and its opposite end is free to project through the release device 40 in the manner and for the purpose hereinafter described.

Release device 40 comprises a channel 44, a second channel 46 and a plate 48 and there is a screw 50 which constitutes the operating factor of said device. Band A is secured to the bottom wall of channel 44. Channel 46 is mounted within channel 44 in transverse relation thereto. Band B is drawn between the bottom walls of channels 46 and 44 and between the two side walls of said channel 44. It will be observed in Fig. 2 that plate 48 is provided with reduced end portions 48a and these reduced end portions project through slots 52 formed in the side walls of channel 44. This is shown in Figs. 1 and 3. It will be observed that this arrangement secures plate 48 to the side walls of channel 44 and said plate, being disposed between the side walls of channel 46, also locks said latter channel in place in channel 44, while leaving it a limited measure of movement as will hereinafter more fully appear.

Plate 48 is provided with a tapped hole 54 to receive screw 50. The upper end of said screw may be bent over laterally to form a handle portion 50a. Channel 46 comprises the pressure member of the mechanism and particularly its bottom wall, sometimes described as a pressure pad. When screw 50 is turned in one direction relative to plate 48, it tends to push the pressure pad or channel 46 against band B and thereby presses said band against the bottom wall of channel 44. The band is thereby locked in place in said channel 44. When screw 50 is turned in the opposite direction, it relieves its pressure upon the pressure pad or channel 46, thereby releasing the grip of said pressure pad or channel 46 upon band B, freeing said band for longitudinal movement in either direction relative to channel 44.

Handle 50a of screw 50 is a relatively short handle, just long enough to be gripped by the fingers of the person operating the device herein claimed. It does not provide excessive leverage. Consequently, when said handle 50a is turned manually to tighten screw 50 against the pressure pad or channel 46, only a limited amount or extent of frictional engagement between said pressure pad or channel 46 and channel 44 on the one hand and band B on the other hand is provided. By way of illustration, said handle 50a may be about two or two and a half inches long. The average person operating said handle is able to tighten it in the normal course of use so that it will hold band B tight against a tire pressure of up to eight to ten pounds. When the tire pressure exceeds that amount, the frictional grip of channels 46 and 44 upon band B will be overcome and said band will slip longitudinally through the release device 40 in order to yield to the pressure built up within the tire.

It will be observed that the free end of band B may be withdrawn completely from release device 40 in order to break the continuity of the entire device as shown in Fig. 1. By the same token, said free end of band B may very readily be slipped back into and through said release device.

The foregoing is illustrative of a preferred form of this invention and it will be understood that this preferred form may be modified and other forms may be provided within the broad spirit of the invention and the broad scope of the claim.

I claim:

A band tightening device of the character described, comprising a frame, a screw rotatably mounted in said frame for rotation about its longitudinal axis, stop means provided on said frame to prevent longitudinal movement of said screw relative to said frame, a handle connected to said screw to turn it in either direction about its longitudinal axis, a nut mounted on said frame and on said screw, guide means on said frame preventing angular movement of said nut about the longitudinal axis of said screw while permitting endwise movement of said nut longitudinally of said screw, a band secured at one end to said frame and describing a loop and operatively connected at its opposite end to said nut, whereby said band may be looped around an object and tightened upon said object by turning the screw, said frame including a channel and a strap secured at its ends to said channel, said strap being constructed and arranged to conform to the general curvature of the circumference of a tubeless tire, said screw being disposed within said channel, longitudinally thereof, said nut being also disposed within said channel, said channel having walls constituting the guide means which prevent angular movement of the nut while permitting endwise movement thereof, said walls being also disposed to confine said nut to the frame, said band consisting of two pieces, a clamp having one end of one of said two pieces secured thereto, the other end of said one piece being secured to the frame, the other piece being secured at one end to the frame and its opposite end being drawn through said clamp, whereby, when the clamp is clamped upon said opposite end of said other piece, the two pieces of said band function as a single band, said clamp having a bottom plate, a pressure pad situated above said bottom plate, and a screw for pushing said pressure pad in the direction of said bottom plate, the portion of the band which is drawn through said clamp being disposed between said bottom plate and said pressure pad, whereby said portion of the band is frictionally gripped between said bottom plate and said pressure pad when said last mentioned screw is turned to force the pressure pad in the direction of said bottom plate.

References Cited in the file of this patent

UNITED STATES PATENTS

| | | |
|---|---|---|
| 1,031,813 | Nix | July 9, 1912 |
| 1,917,192 | Hueber | July 4, 1933 |
| 2,087,328 | Mitchnick | July 20, 1937 |
| 2,149,395 | Glynn | May 7, 1939 |
| 2,335,985 | Yeida | Dec. 7, 1943 |
| 2,370,766 | Austin | Mar. 6, 1945 |
| 2,503,189 | Biba, Jr. | Apr. 4, 1950 |
| 2,541,206 | Christophersen | Feb. 12, 1951 |